United States Patent [19]

Wingfield, Jr.

[11] 4,192,929
[45] Mar. 11, 1980

[54] CORROSION RESISTANT PRIMERS

[75] Inventor: Robert C. Wingfield, Jr., Southfield, Mich.

[73] Assignee: Ford Motor Company, Dearborn, Mich.

[21] Appl. No.: 938,673

[22] Filed: Aug. 31, 1978

[51] Int. Cl.² ............................................. C08L 63/00
[52] U.S. Cl. ............................. 525/110; 260/29.2 EP; 260/294 R; 525/117; 525/118; 525/119; 525/511; 525/913
[58] Field of Search ............ 260/834, 29.2 EP, 29.3 R

[56] References Cited

U.S. PATENT DOCUMENTS

| | | | |
|---|---|---|---|
| 3,336,253 | 8/1967 | Wong | 260/29.3 |
| 3,456,035 | 7/1969 | Enders | 260/834 |
| 3,869,366 | 3/1975 | Suzuki | 260/29.2 EP |
| 3,937,679 | 2/1976 | Bosso | 260/834 |
| 3,962,499 | 6/1976 | Brody | 260/29.2 EP |
| 3,975,346 | 8/1976 | Bosso | 260/29.2 EP |
| 4,021,503 | 5/1977 | Goulding | 260/834 |
| 4,064,090 | 12/1977 | Gibson | 260/29.4 R |
| 4,076,675 | 2/1978 | Sommerfeld | 260/29.4 UA |
| 4,076,676 | 2/1978 | Sommerfeld | 260/834 |
| 4,081,491 | 3/1978 | Bauer | 260/834 |

*Primary Examiner*—Paul Lieberman
*Attorney, Agent, or Firm*—Edmund C. Ross, Jr.; Olin B. Johnson

[57] ABSTRACT

Electrodepositable resins that do not require chromate corrosion inhibiting pigments and comprise (A) the at least partially neutralized reaction product of (1) an epoxy reactant having about two or more epoxy groups that are not linked by carboxy-ester moieties and (2) an amine reactant selected from mono and diamines containing primary or secondary amino groups and also being at least about 50 mole percent hydroxy amine, (B) water soluble or dispersible amino resin crosslinking agent are improved by incorporation of (C) a co-reactive flow control agent that comprises, for example, a polyepoxy copolymer having a molecular weight desirably between 1000–20,000. The co-reactive flow control agent, used at low levels, allows formation of smooth, non-tacky films exhibiting desirable corrosion resistant properties.

9 Claims, No Drawings

CORROSION RESISTANT PRIMERS

BACKGROUND OF THE INVENTION

This invention relates to preventing corrosion of susceptible substrates as ferrous metals through electrodeposition of protective coatings and includes, in particular, electrodepositable primers that retard corrosion of such substrates, even when formulated to be free of such inhibiting pigments as chromates, while at the same time providing smooth, desirable coatings after baking.

The corrosion of steel immersed in an aqueous environment can often be slowed to an acceptable rate by the introduction of corrosion inhibitors soluble in the aqueous medium. In the case of steel structures subjected intermittently to a corrosive environment, or under conditions which preclude effective incorporation of a corrosion inhibitor into the corrosive medium, protective organic coatings are often used. One of the major functions of these coatings is to act as a reservoir for sparingly soluble inorganic corrosion inhibitors which act to slow the rate of corrosion at coating defects and other incipient anodic corrosion sites. Among the most effective inhibitors are inorganic chromates whose safety has been questioned by some. While the elimination of these pigments may therefore be desirable, it is found that in the absence of effective corrosion inhibiting pigments extensive adhesion failure adjacent to coating defects and flaws can take place, resulting ultimately in the uncontrolled spread of corrosion. The principal cause of corrosion-induced adhesion failure is generally thought to be displacement and/or degradation of the coating resin by cathodically produced hydroxide ion. Corrosion inhibitors suppress this effect by slowing the overall rate of corrosion, limiting the amount of alkali produced. In the absence of corrosion inhibitors it is therefore necessary that the coating resin be exceptionally resistant to displacement and/or degradation by corrosion-produced hydroxide.

A principal objective is the provision of resins suitable for electrodeposition processes and additionally highly resistant to alkali degradation. A further objective is the provision of organic coating formulations which enable ferrous substrates to be protected from corrosion without the incorporation of possibly deleterious corrosion inhibitive pigments. It is further desired that the organic coatings be suitable for use as primers on automotive steel substrates and that the application and handling characteristics be compatible with conventional electrodeposition commercial paint operations and practices. It is still further desired that the coatings exhibit, after bake, a smooth, unrippled appearance.

Commonly assigned U.S. Ser. No. 938,677, concurrently filed herewith in the name of Dickie and Holubka disclose crosslinking compositions that, upon application, and bake, are found to desirably retard corrosion of ferrous substrates and also, when at least partially neutralized, may be electrodeposited. Such electrodepositable crosslinking compositions, however, are not wholly satisfactory insofar as they leave an uneven coating surface after deposition and bake within conventional schedules. Moreover, while inclusion of certain flow control agents as poly- (butylacrylates) lead to more smooth coatings, the coatings remain tacky after bake. In this invention, coatings with both uniformly smooth and non-tacky surfaces are achieved after baking while desirable corrosion protection properties as well as aqueous bath stability are maintained.

THE INVENTION

This invention relates to electrodepositable compositions that retard corrosion of susceptible substrates in the absence of conventional amounts of inhibiting pigments as chromates and includes, especially, primer compositions adapted for use on automotive steels and other such substrates. More particularly, this invention includes electrodepositable crosslinking compositions that cure into desirable coatings on bare and treated steels and resist spread of corrosion, particularly from coating surface defects, while yielding, after bake, coatings with uniformly smooth, nontacky surfaces. Still further, this invention includes processes using these electrodepositable compositions.

Briefly, the crosslinking compositions include (I) the at least partially neutralized reaction product of (a) epoxy reactant and (b) amine reactant, (II) amino resin crosslinking agent, and (III) a co-reactive flow control agent, wherein the amine reactant comprises secondary amine and, also, is mostly, or all, on a molar basis, hydroxy amine that preferably comprises secondary amine.

Of essential importance to this invention in arriving at baked coatings with smooth, non-tacky surfaces is employment of a co-reactive flow control agent that is stably dispersed with the crosslinking composition in the electrodeposition bath. The co-reactive flow control agent associates with the protonated epoxy amine reaction product in the deposition bath such that, upon application of an electric field, the charged reaction product together with associated co-reactive flow control agent and amino resin crosslinking agent, travels to cathodic sites whereupon a water insoluble coatings at the site is deposited.

The water insoluble coating, however, is not smooth but, rather, of uneven appearance. Upon baking, reactive groups of the co-reactive flow control agent enter into the crosslinked network of epoxy amine reaction product and amino resin crosslinking agent to insure a non-tacky film while at the same time its ability to physically modify the organic film during bake allows for smooth, uniform, protective coatings.

DETAILED DESCRIPTION OF THE INVENTION

The essential components of electrodepositable crosslinking compositions of this invention include certain epoxy and amine reaction products, amino resin crosslinking agent and co-reactive flow control agent. The components are combined to provide the water dispersible crosslinking compositions.

Compositional Ingredients

(A) EPOXY-AMINE REACTION PRODUCT

The epoxy amine reaction product is formed in nonaqueous medium by reacting a di or polyepoxide (that is preferably free of carboxy ester moieties linking the epoxide groups) with certain amines. The epoxy reactant and amine reactant are chosen to provide a water dispersible reaction product upon neutralization with water soluble acid but an essentially water insoluble product upon deposition at cathodic deposition sites.

1. Epoxy Reactant—The epoxy reactant essentially should contain at least about two, on the average, epoxy groups per molecule and may contain three or more with a molecular weight preferably above about 300 (number average) and up to about 10,000 or more, depending on factors as desired viscosity and solids content.

One class of suitable epoxy compounds for the epoxy reactant include reaction products of di or polyhydric, mono, di or polycyclic compounds with epihalohydrins of the formula

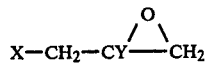

wherein X is halogen as chloro and Y is hydrogen or lower alkyl such as methyl or ethyl which epihalohydrin reaction products are exemplified by such straight chain epoxy terminated compounds containing glycidyl ether groups as bis-phenol A-epichlorohydrin reaction products that are commercially available as, for example, Epon 828, 1001 or 1004 (marketed by Shell Chemical Company). Such products contain aromatic groups as benzene nuclei at a preferred average of at least about one, more preferably for this invention at least about two, on the average, for each terminal epoxy group. Especially suitable are bis-phenol A-epichlorohydrin reaction products comprising in major amounts up to 10 or more bis-phenol moieties within the epichlorohydrin reaction product backbone, e.g. molecular weights in a range of up to about 8000, preferably 700–6000, on a number average basis.

Other examples of epoxy compounds for the epoxy reactant include polyepoxy compounds (averaging more than about two epoxy groups per molecule) which are also commercially available. In this group of epoxy compounds are the Novolac epoxy resins, e.g. Epon 152 and 154 (marketed by Shell Chemical Company). These polyepoxy resins include epoxidized products of phenol formaldehyde resins that contain terminal glycidyl ether groups from aromatic moieties.

Aliphatic including cycloaliphatic epoxy compounds having, on the average, at least about two epoxy groups per molecule may also be employed. Such aliphatic epoxy compounds include epihalohydrin and aliphatic di or polyols such as glycols reaction products, epoxidized polybutadienes, vinylcyclohexenedioxide and dipentene dioxide. Still further, hydrogenated bisphenol A epichlorohydrin products may also be employed.

Compatible mixtures of any of these epoxy compounds are also suitable.

In one preferred embodiment, the epoxy reactant comprises relatively high molecular weight (e.g. number average above about 700) epoxy compound that have hydrophobic groups (as epihalohydrin reaction products of a diol, e.g. bis phenol-A) for these have been found to advantageously further provide enhanced moisture resistance to the cured coatings as compared to lower molecular weight epoxy compounds made in this way. Alternatively, as will be more fully described hereinafter, certain lower molecular weight epoxy compounds may be reacted with primary and secondary alkanol amines to provide epoxy amine reaction products that similarly provide more desirable moisture resistance. Preferably, however, the epoxy reactant comprises higher molecular weight epoxy compounds as those bis-phenol-A-epichlorohydrin reaction products that have at least about 25 mole percent (more preferably at least about 75 mole percent) of compounds that have two or more, e.g. about 3–10 aromatic groups per epoxy group.

2. Amine Reactant—The amine reactant preferably comprises mono and diamines that serve to open the epoxy group during reaction with the epoxy reactant and act as a cationic group after such reaction and neutralization with acid, as hereinafter described. Amines containing primary or secondary amino groups are suitable and such amines may also contain tertiary amino groups which may also be neutralization after formation of the epoxy and amine reaction product. Normally satisfactory amines will contain up to about 20 carbon atoms per amino group.

At least about 50 mole percent (more preferably at least about 75 mole percent) of the amine reactant comprises hydroxy amine having one or more (preferably two) hydroxy groups on carbon atoms that are not adjacent to any amino nitrogen.

There appears no limitation to the amount of amino groups present in the amines of the amine reactant as long as gell free product is obtained of suitable viscosity. For example, the amine reactant may comprise diamines and especially suitable diamines are hydroxy diamines wherein one amino group is primary or secondary and another amino group is tertiary. With such diamines greater flexibility as to neutralization with acid is achieved. Other diamines that are not hydroxy diamines may also be employed, providing of course, suitable hydroxy amine is included in the amine reactant.

Secondary mono amines are typically advantageous with higher molecular weight epoxy compounds whereas combinations of primary and secondary amines are advantageous with lower molecular weight epoxy compounds as the epoxy reactant so as to increase the molecular weight of the epoxy amine reaction product. Secondary mono-amines would be normally employed with polyepoxide having three or more epoxy groups per molecule. Primary amines and particularly primary amines that are diamines comprising primary and tertiary amino groups can be used with di-epoxides and even high molecular weight di-epoxides to yield desirable stable amine epoxy reaction products.

Hydroxy of the hydroxy amine incorporated into the epoxy and amine reaction product serves as a moiety that is believed to chemically react with at least a portion of the amino resin crosslinking agent during curing so as to provide a crosslinked coating; it is preferred that the hydroxy amine have primary hydroxy attached to aliphatic carbon. Also, at least one amino nitrogen of the hydroxy amine is preferably substituted only by aliphatic carbon, i.e. hydroxy aliphatic amine, although the aliphatic carbon chain may be interrupted or substituted as with non-interferring heteroatoms as oxygen or aromatic as aryl or tertiary amine.

Hydroxy aliphatic secondary amines and, particularly hydroxy alkyl secondary monoamines are advantageous for the amine reactant in many instances, and especially desirable are hydroxy alkyl mono-amines wherein the alkyl group is preferably lower alkyl e.g., up to 7 carbon atoms. In one preferred embodiment, the amine reactant comprises all or nearly all (e.g. 90 mole percent or greater) secondary amine that is amino alcohol and especially amino alcohol bearing two hydroxy alkyl substituents as, for example, diethanol amine.

A class of preferred hydroxy amines is illustrated according to the following formula:

wherein R and R' are independently hydrogen or straight or branched chain aliphatic of up to about 10 carbons each providing that (a) at least one of R and R' is not hydrogen and (b) at least one of R and R' is substituted by hydroxy on a primary carbon atom that is not adjacent to any amino nitrogen. R and R' can, for example, form part of a ring compound as a six membered ring as 1- piperazine ethanol and 2- piperidine ethanol. Further, one of R and R' may, for example, also contain an hydroxy aliphatic substitute tertiary amino group and the other of R and R' may be hydrogen. More preferably, R and R' are independently alkyl and desirably up to 7 carbons each and especially hydroxy (primary) alkyl up to 4 carbons each.

A variety of amines, however, may be suitably employed together as, for example, primary and secondary amines which are mixtures of alkyl amines and hydroxy alkyl amines. The important criterion is that there be sufficient hydroxy functionality, especially primary hydroxy, in the reaction product of the amine reactant and epoxy reactant to insure adequate reaction with the amino resin crosslinking agent.

Preferably, however, about 90 or more mole percent of the amine reactant comprises amino alcohols with primary hydroxy and especially hydroxy alkyl monoamine preferably bearing a primary hydroxy on both alkyl groups.

3. Reaction Conditions for Product of Epoxy Reactant and Amine Reactant

The epoxy and amine reactants are reacted at conditions that allow opening of the epoxy ring by amino nitrogen and provide a gel free reaction product. With secondary amines, this generally results in tertiary amino groups whereas primary amines provide secondary amino groups which may undergo further reaction with an unreacted epoxy of the same or more probably of another molecular epoxy reactant resulting in chain extension.

The reaction medium comprises preferably nonaqueous medium that may be of diverse but preferably polar character and serves to maintain contact of reactants, control reaction speed, maintain desirable viscosity and other functions well known in the art. Thus, suitable solvents and diluents for the reaction medium include aromatic and aliphatic hydrocarbons, halides, ethers, alcohols, ketones such as methylamyl ketone, n-amyl ether, xylene, butanol, oxygenated solvents such as propylene glycol monopropyl ether, cellosolves as 2-ethoxy ethanol, 2-butoxy ethanol, carbitols as ethoxy butoxy ethanol, and the like including mixtures of these. Cellosolves as 2-ethoxy ethanol are preferred.

Elevated reaction temperatures may be employed to facilitate reaction between the epoxy reactant and amine reactant and the reaction may be conducted stepwise. The reaction is complete when the product is substantially free of unreacted epoxy groups as nearly equivalent amounts (e.g. about 0.9–1.0 amine equivalents per 1 to 1.1 epoxy equivalent wherein an amine equivalent is one for a mole of secondary monoamine and two for a mole of primary monoamine and mole of diepoxide compound, for example, has two equivalents) are preferred. Thus, the reaction product of the epoxy reactant and amine reactant should contain less than 20% of the original unreacted epoxy groups, more desirably less than 10% as 5% or less unreacted epoxy groups, based on the number originally present.

The reaction product of the epoxy reactant and amine reactant is at least partially neutralized with preferably water soluble acid to form a water soluble or dispersible neutralization product that, upon deposition at cathodic deposition sites, forms a water insoluble coating along with the other compositional ingredients.

Any acid may be chosen that gives such water dispersible neutralization products and water insoluble deposition products, but preferred acids are organic acids, especially organic water soluble acids as formic, acetic as well as other water soluble or dispersible acids as hydroxy organic acids e.g., lactic acid. Desirable results are achieved with a neutralization of about 50–80% of the testiary amino groups of the reaction product (A), although, of course, other levels may be more desirable in other instances as to promote dispersibility, deposition and the like.

(B) AMINO RESIN CROSSLINKING AGENT

The amino resin crosslinking agent may be admixed with the above reaction product (A) at levels of about 5–60 weight percent of the weight of (A). Preferred amino resin crosslinking agent includes well known and commercially available materials that are principally condensation products of amino or amido compounds with aldehydes which may be modified by monohydric alcohols of normally up to about four carbons. A preferred range for (B) is between about 10–30% by weight of (A).

Especially preferred amino resin crosslinking agent is partially alkylated melamines (melamine formaldehyde resins modified by alcohols) e.g. partially methylated melamines and butylated melamines. Another preferred crosslinking agent is urea formaldehyde condensate modified by alcohol as butylated urea resin. Mixtures of crosslinkers as mixtures of alkylated melamines and alkylated urea are suitable as an amino resin crosslinking agent.

Other suitable crosslinkers that are amino resins include glycol uril resins and benzoguanimine resins.

(C) CO-REACTIVE FLOW CONTROL AGENT

The co-reactive flow control agent is preferably employed at levels at least about 0.1 percent by weight of the weight of the epoxy amine reaction product (A), more desirably between about 0.5–5 percent by weight and advantageously has a molecular weight between about 1000–20,000 (number average), more preferably about 1000–10,000, especially about 2000–5000.

The co-reactive flow control agent is desirably quantitatively polyfunctional and may be designed to react with either or both of the epoxy amine reaction product (A) and the amino resin crosslinking agent (B) as diverse reactive functionalities such as epoxy, carboxy and hydroxy are suitable.

The co-reactive flow control agent preferably comprises a copolymer that contains, in addition to the reactive portion that enters into the crosslinking reaction during baking, a non-reactive portion that serves to physically interact as by plasticizing the crosslinking network thereby improving film flow properties. Furthermore, the character of these copolymers allows for stable incorporation into and deposition from aqueous electrodeposition baths.

These preferred copolymers may be made by conventional techniques e.g., free radical initiated polymerization as by mixing constituent olefinically unsaturated monomers in the presence of free radical initiators. The reactive monomers (i.e., reactive with the crosslinking network) comprise about 5–95 mole percent of the copolymer and the copolymerizable therewith, non-reactive monomers (i.e., non-reactive with the crosslinking network) comprise about 95–5 mole percent.

Preferred compolymers in this class comprise quantitatively polyfunctional copolymers of hydroxy, epoxy or other such reactive functional monomers such that preferably about 5–80 mole percent of the copolymer is made from these functional monomers and 95–20 mole percent is made from other copolymerizable monomers that are preferably hydrophobic in character and desirably contain aliphatic chains mostly of about 3–18 carbons which may, however, be interrupted by heteroatoms such as oxygen.

In one embodiment, the co-reactive flow control agent comprises a polyepoxy functional copolymer made from monolefinically unsaturated epoxy functional monomers e.g., glycidyl esters as those within the formula:

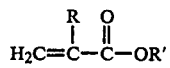

wherein R is hydrogen or lower alkyl as methyl and R' is epoxy substituted alkyl, e.g. a glycidyl acrylate or methacrylate at about 5–40 mole percent. The other copolymerizable monomers of the copolymers, such as alkyl acrylates, methacrylates, alkyl vinyl compounds such as ethers, esters and the like, a major molar portion of which bearing aliphatic carbon chains of about 3–18 carbons, are at 95–60 mole percent. A preferred class in this embodiment of the other monomers, are acrylates and methacrylates made from reacting acrylic acid or methacrylic acid with monohydric alcohols of 1–12 carbons with at least about 50 mole percent preferably being $C_4$–$C_{12}$ alcohols, particularly $C_4$–$C_8$ alcohols. These other copolymerizable monomers may also comprise still other monomers to further modify the copolymer properties without detracting from its function as a flow control agent e.g. alkylvinyl ethers as $C_1$–$C_{18}$, preferably $C_4$–$C_{12}$ alkyl vinyl ethers, (for instance, butyl vinyl ether), vinyl aromatics as styrene and the like.

In another embodiment, the co-reactive flow control agent comprises a polyhydroxy functional copolymer made from hydroxy functional monomers including such hydroxy esters as those within the formula:

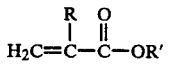

wherein R is hydrogen or lower alkyl as methyl and R' is hydroxy substituted alkyl, e.g. $C_1$–$C_7$ hydroxy substituted alkyl esters of acrylic or methacrylic acid as hydroxy propyl methacrylate, at about 5–40 mole percent and other copolymerizable monomers, as above, that provide hydrophobic character to the flow control agent.

(D) OPTIONAL INGREDIENTS

Di- and polyhydroxy compounds of diverse character may be employed in minor amounts to modify film properties as well as acting as solvent including reactive solvent for solubilizing the crosslinking compositions. Usually, such di- or polyhydroxy compounds will be at levels below about 20% by weight of (A) as 5% of (A) or less.

A preferred class of these hydroxy compounds include aliphatic di hydroxy compounds, especially glycols and glycol ethers of the formula HO—$(C_aH_{2a}O)_x$ $(C_bH_{2b}O)_y$H wherein a, b, x and y are independent integers and a and b are from 2 to 6 and x and y are from 0–10 with the sum of x and y being from 1 to 10. Examples include ethylene glycol, dipropylene glycol, and 1,6 hexanediol.

Pigments may be used in the primer compositions of this invention in accordance with usual technique except, if desired, chromate pigments need not be included to get good corrosion resistance. Exemplary pigments include titanium dioxide, silica, carbon black, silicates as aluminum silicate, iron oxide, and barytes and are advantageously employed at pigment: binder (i.e., sum of (A) and (B) above) weight ratios of about 1:20 to 3:1. Other ingredients as solvents, diluents, surfactants, catalysts and the like may also be included for their respective functions.

Formulation and Deposition

The at least partially neutralized reaction product (A), amino resin crosslinking agent (B), co-reactive flow control agent (C), as well as other optional components (D) as pigments, surfactants, adjusts as photostabilizers and the like are stably dispersed in water at levels as above described at a pH in a range from about 2–9, more preferably below 7 as about 4–6.5. Good results in terms of bath stability are seen at a pH of about 5–6. Solids content normally ranges from about 5–25% by weight although such content is not critical. Conductivity usually will be in a range from $10^2$–$10^4$ μMHO. Deposition is preferably through constant voltage or constant current, as desired.

Bake temperatures after deposition range within conventional electrodeposition process considerations as, for instance, 180° C. at about 20–30 minutes, and advantageously these and even lower bake temperatures e.g. 150° C. at similar times are accomplished through use of the co-reactive flow agent as previously described.

The baked coatings are desirably smooth and range for advantageous corrosion protection as well as ease of processing between about 0.5–1.5 mil., normally 0.8–1.2 mil. in thickness.

The following examples are intended as illustrating this invention in its currently preferred embodiments and are not intended as limited to the scope of the invention as alternatives and modifications will be readily apparent. All temperatures are in degrees Celsius and all parts in parts by weight, unless otherwise indicated.

EXAMPLE I (a) Into a three-neck round bottom container with stirrer, condenser, dropping funnel, and nitrogen inlet and outlet, is added 666.67 parts of butyl acetate. The content of the flask is heated to 125° C., after which a monomer solution (200 parts glycidyl methacrylate, 800 parts butyl methacrylate and 45 parts of t-butyl-peroxide) is added over 2¼ hours with constant stirring. The solution is heated for thirty minutes after the monomer addition is completed, and then 5 parts t-butyl-peroxide is slowly added. The mixture is heated an additional two hours at 125° C. and then cooled to room temperature. The resulting solution of 57% solids has a viscosity of 47.8 seconds in a number four Ford cup.

(b) The procedures of Example I (a) are repeated except that an equal number of parts of hydroxy propyl methacrylate replaces the glycidyl methacrylate.

(c) The procedures of Example I (a) are repeated except that the monomer solution is 100 parts of glycidyl methacrylate and 900 parts of butyl methacrylate.

(d) The procedures of Example I (a) are repeated except that 50 parts of butyl methacrylate are replaced with 50 parts of 2-ethyl hexyl acrylate.

EXAMPLE II (a) Into a three-necked, round-bottom container, equipped with a thermometer, stirrer, dropping funnel and condenser, are placed Epon 1004 [(1)] 351.6 parts; and 302.7 parts of ethoxyethanol. The contents of the flask are stirred overnight to obtain a clear solution. The solution is heated to 50° C. To this heated solution is added, dropwise, over two hours, a solution of 49.05 parts of 1-piperazineethanol in 99.0 parts of ethoxyethanol. The reaction mixture temperature is maintained at 50° C. during the amine addition and for an additional four-hour cookdown period. The reaction mixture is then cooled to room temperature with stirring over a twelve hour period.

[(1)] A product of Shell Chemical Company which is a reaction product of epichlorohydrin and bis-phenol A and described as being a solid with a mp 95°–105° C.; Gardner Holt viscosity at 25° C. of Q-U (40% w. in. butyl Dioxitol[(R)]) Epoxide Equivalent 875–7000 (grams resin per gram-equivalent of epoxide; Equivalent weight (gram resin to esterify one mole acid) 175. (Data Sheet SCi 69-58).

(b) To a mixture of glacial acetic acid, 11.4 parts, water, 11.4 parts is added slowly with stirring 135.5 parts of the epoxy-alkanol amine reaction product solution described in Example II (a). To this mixture is added slowly with stirring, 50.0 parts of water followed by 135.0 parts of additional epoxy-alkanolamine reaction product of Example II (a). The mixture is stirred at high speeds (2-4,0000 rpm) to get a uniform dispersion. Cymel 1130[(2)], 70.2 parts is added slowly as the high speed stirring continues. A glycidyl methacrylate/butyl methacrylate copolymer solution (56.2% by weight solids in butyl acetate from Example I (a)), 4.80 parts is slowly added to the mixture with stirring. To this mixture is added 481.7 parts water slowly with continued high speed stirring, to yield a cream colored emulsion. This emulsion has a pH of 4.92, a viscosity of 11.3 seconds in a number four Ford cup, and a conductivity of $2.4 \times 10^3$ μMHO.

[(2)] A product of American Cyanamide which is an alkylated melamine described as partially methylated and butylated melamine.

The above formulated mixture is electrocoated on bare steel plates, which served as the cathode, over a range of 150–270 volts, with coating times varying from one to three minutes. Coulombic yield of 20–28 mg/coulomb and maximum current densities of 4.5–5.8 milliamps/sq cm are obtained. (The current density reaches maximum and decreases to low value). The continuous clear film gives 72 hours protection in the salt spray chamber after cure at 180° C. for thirty minutes.

EXAMPLE III (a) To glacial acetic acid, 5.1 parts is added 5.1 parts of water, followed by the slow addition with stirring of 90 parts of the epoxy amine reaction product of Example II (a). Water, 36 parts, is added slowly with stirring to the mixture followed by the addition of 90.4 parts of additional reaction product of Example II (a). The mixture is stirred at high speeds (2-4,000 rpm) to get a uniform dispersion. Cymel 1130[(1)], 46.85 parts, is added slowly as the high speed stirring continued. A copolymer solution (56.2% solids in butyl acetate prepared in Example I (a)), 3.2 parts is slowly added to the mixture with stirring. To this mixture was added 323.4 parts of water, slowly with continued high speed stirring, to yield a cream colored emulsion. This emulsion has a pH of 5.54, a viscosity of 11.6 seconds (#4 Ford cup) and a conductance of $1.4 \times 10^3$ μMHO. The above formulated mixture is electrocoated on bare steel plates which serve as the cathode, over a range of 150–270 volts, with coating times varying from one and one-half to three minutes. Coulombic yields in the range of 36–53 mg/coulomb and maximum current densities in the range of 3.8–4.9 milliamps/sq cm are obtained. The clear continuous film gave 72 hours protection in the salt spray chamber after cure at 180° C. for thirty minutes.

[(1)] A product of American Cyanamide, see Example II, footnote (2).

EXAMPLE IV (a) Into a three-necked, round bottom container equipped with a thermometer, stirrer, dropping funnel and condenser, are placed Epon 1004 [(1)], 351.6 parts; and 308.7 parts of ethoxyethanol. The contents of the flask are stirred overnight to obtain a clear solution. The solution is heated to 60° C. To this heated solution is added, dropwise, over two hours, a solution of 48.46 parts of 1-piperidineethanol in 97.4 parts of ethoxyethanol. The reaction mixture temperature is maintained at 60° C., during the amine addition and for an additional four-hour cookdown period. The reaction mixture is then cooled to room temperature with stirring over a twelve hour period.

[(1)] A product of Shell Chemical Company, see Example II, footnote (1).

(b) To a mixture of glacial acetic acid, 5.72 parts, and water, 5.52 parts, is added slowly with stirring 136.1 parts of the epoxy-alkanolamine reaction product of Example IV (a). To this mixture was added slowly with stirring 55 parts of water followed by 136.1 parts of addition epoxy-alkanolamine reaction product of (A). The mixture is stirred at high speeds (2-4,000 rpm) to get a uniform dispersion. Cymel 1130[(2)], 70.5 parts is added slowly as the high speed stirring continues. A copolymer solution (56.2% solids in butyl acetate prepared as in Example I (a)), 3.2 parts, is slowly added to the mixture with stirring, to this mixture is added 486.1 parts of water slowly with continued high speed stirring, to yield a cream colored emulsion. This emulsion has a pH of 6.25, a viscosity of 10.4 seconds in a #4 Ford cup and a conductance of $1.15 \times 10^3$ μMHO. The emulsion is electrocoated as in Examples II and III above. Coulombic yields in the range of 40–53 mg/coulomb and maximum current densities in the range of 1.7–3.1 milliamps/sq. cm. are obtained. The clear continuous films give 72 hour protection in the salt spray chamber after cure at 180° C. for 30 minutes.

[(2)] A product of American Cyanamide Company, see Example II, footnote (2).

EXAMPLE V (a) Into a three-necked, round-bottom flask, equipped with a thermometer, stirrer, dropping funnel and condenser, are placed Epon 1004[(1)], 468.8 parts and 416.3 parts of ethoxyethanol. The reaction mixture is stirred and heated to 40° C. to dissolve the Epon 1004. The mixture is then heated to 60° C. To this heated solution is added, dropwise, over two hours, a solution of 52.7 parts of diethanolamine in 105 parts of ethoxyethanol. The reaction mixture temperature is maintained 60° C. during the amine addition and for an additional four hour cookdown period. The reaction mixture is then cooled to room temperature with stirring over a twelve hour period.
[1] A product of Shell Chemical Company, see Example II, footnote (1).

(b) To a mixture of glacial acetic acid 5.85 parts, water, 5.85 parts is added slowly with stirring 135 parts of the epoxy-alkanol amine reaction product of Example V (a) described above. To this mixture is added slowly with stirring 54.8 parts water followed by 135 parts of additional reaction product of Example V (a). The mixture is stirred at high speeds (2–4,000 rpm) to get a uniform dispersion. Cymel 1130[2], 27.0 parts is added slowly as the high speed stirring continues. A copolymer solution (56.2% solution in butyl acetate of Example I (a)) 4.8 parts is slowly added to the mixture with stirring. To this mixture is added slowly 486.5 parts of water, with continued high speed stirring, to yield a cream colored emulsion. This emulsion has a pH of 5.56 and a viscosity of 11.7 seconds on the #4 Ford cup with a conductance of $0.83 \times 10^3$ μMHO.
[2] A product of American Cyanamide, see Example II, footnote (2).

The above formulated mixture was electrocoated as in Example II (b). Coulombic yield of 30–48 mg/coulomb and maximum current densities in the range of 3.6–5.3 milliamps sq. cm. are obtained. The clear continuous film after cure at 180° C. for thirty minutes gave at least 240 hours salt spray protection.

EXAMPLE VI (a) To the epoxy diethanol amine reaction product prepared in Example V(a), 60 parts is added slowly with stirring carbon black, 1.5 parts and aluminum silicate, 28.5 parts. The mixture is ball milled to a 7.5 Hiegman. This mixture is added slowly with stirring to a solution of acetic acid, 1.3 parts, in water, 1.3 parts, water, 83 parts is added slowly with continuous stirring.

(b) In a separate container 5.2 parts of acetic acid and 5.2 parts of water are mixed. To this solution is added slowly with stirring 120 parts of the reaction product of V (a). Water, 33 parts is added slowly with stirring, followed by the addition of 120 parts of the reaction product of V (a). Cymel 1130[1] 30 parts is then added followed by the addition of 5.34 parts of a copolymer solution (56.2% solids in butyl acetate as prepared in Example I(a)) with stirring to give a uniform dispersion. The dispersion prepared in Example VI above, is then added slowly with high speed stirring (2–4,000 rpm) to give a uniform pigmented dispersion. Water, 293.1 parts is then added with stirring to give a dispersion with a pH of 5.57 and a viscosity of 12.5 sec.
[1] A product of Shell Chemical Company The film is electrodeposited, cured and showed the corrosion protection equivalent to films prepared in Example V.

EXAMPLE VII

In the procedures of Examples II–V the flow control agent of Example I(b) replaces, on an equal weight basis, the flow control agent of Example II(a). Substantially equivalent results as in Examples II–V are obtained.

EXAMPLE VIII

In the procedures of Example VI, the flow control agent of Example I(c) and I(d) replaces, respectively, in two primer compositions, on an equal weight basis, the flow control agent of Example I(a). Substantially equivalent results as in Example VI are obtained in each case.

EXAMPLE IX

In the procedures of Examples II–VI, the amount of flow control agent of Example I(a) is doubled on a weight basis. Similar results of these Examples II–VI are obtained.

EXAMPLE X (a) Into a three-neck round-bottom container, equipped with a thermometer, stirrer, dropping funnel and condenser, are placed EPON 1004 [1] 281.2 parts, and 213 parts of ethoxyethanol. The contents of the flask was stirred overnight to obtain a clear solution. The clear solution was heated to 50° C. To this heated solution is added, dropwise, with stirring, over a two-hour period, a solution of 48.7 parts of N-(3-aminopropyl)-diethanolamine in 68.2 parts of ethoxyethanol. The reaction mixture temperature is maintained at 50° C. during the amine addition and for an additional two hour cookdown period. The reaction mixture is then cooled to room temperature with stirring over a twelve-hour period.
[1] A product of Shell Chemical Company.

(b) To glacial acetic acid, 9.84 parts is added slowly with stirring 166.7 parts of the epoxy amine prepared in Example X (a). Water, 41.3 parts, is added slowly with stirring, followed by the slow addition of CYMEL 1130 [2], 45.5 parts. To this mixture was added 3.2 parts of the copolymer prepared in Example I (a) (56.2% solids in butyl acetate) followed by the slow addition with stirring of 336.7 parts of water. The above formulation is electrocoated on bare steel plates, as described in Example II (b), and cured at 180° C. for thirty minutes, to give at least 24 hour protection in the salt spray chamber.
[2] A product of American Cyanamide.

What is claimed is:
1. An electrodepositable primer composition which comprises an intimate admixture of film forming ingredients which consist essentially of:
(A) A substantially gel free epoxy and amine reaction product, at least partially neutralized, made by reacting in non-aqueous medium:
  1. A non-carboxy ester linked epoxy reactant that has an average of at least about two epoxy groups per molecule;
  2. An amine reactant selected from mono and di-amines that contain a primary or secondary amino group and up to about 20 carbon atoms per amino nitrogen and comprising at least about 50 mole percent hydroxy amine containing one or more primary hydroxy groups,
in an equivalent amount such that the reaction product (A) comprises tertiary amino and primary and secondary hydroxy groups and is substantially free of unreacted epoxy groups;
(B) An amine aldehyde resin crosslinking agent at about 5–60% by weight of the weight of (A);
(C) About 0.1–5% by weight of (A) of a flow control agent having a number average molecular weight of about 1000–20,000 and comprising a reactive copolymer made from:
  (1) 5–95 mole percent any of epoxy, carboxy and hydroxy functional acrylic monomers, and

(2) 95-5 mole percent of other monomers, a major molar proportion of which contain aliphatic carbon chains of about 3-18 carbons.

2. The composition in accordance with claim 1, wherein the epoxy reactant comprises a di-epoxide and the amine reactant comprises secondary amine.

3. The composition in accordance with claim 2, wherein the flow control agent comprises a quantitatively polyfunctional epoxy copolymer.

4. The composition in accordance with claim 2, wherein the flow control agent comprises quantitatively polyfunctional hydroxy copolymer.

5. The composition in accordance with claims 1 or 2 or 3 or 4 wherein the amine aldehyde resin crosslinking agent comprises a partially alkylated melamine.

6. The composition in accordance with claim 5, wherein the flow control agent comprises a copolymer with a number average molecular weight of about 1000-5000.

7. The composition in accordance with claim 6, wherein the amine reactant A 2. comprises monoamine that is di- lower alkanol amine.

8. An electrodeposition process for preventing corrosion of susceptible ferrous substrates which comprises exposing the compositions of claims 1 or 2 or 3 to an electric field wherein the substrate bears a negative charge for a period of about 1-3 minutes to coat the substrate and thereafter removing the coated substrate from the electric field and baking at a temperature up to about 180° C. for about 20-30 minutes.

9. An electrodepositable primer composition which comprises an intimate admixture of film forming ingredients which consists essentially of:
(A) A substantially gel free epoxy and amine reaction product made by reacting in non-aqueous medium:
 1. A non-carboxy-ester linked epoxy reactant that contains an average of about two terminal epoxy groups per molecule;
 2. An amine reactant selected from secondary monoamines having a total of up to about 14 carbon atoms per amino nitrogen, and at least about 50 mole percent of which comprises hydroxy alkyl amine containing two hydroxy groups removed at least one carbon from the amino nitrogen in an equivalent amount such that the reaction product (A) comprises tertiary amino and primary and secondary hydroxy groups and is substantially free of unreacted epoxy groups;
(B) An amine aldehyde resin crosslinking agent at about 10-30% by weight of the weight (A);
(C) About 0.1-5% by weight of (A) of a flow control agent comprising an epoxy or hydroxy functional copolymer made by free radical polymerization of acrylate or methacrylate monomers wherein at about 95-60 mole percent of the monomers comprise alkyl esters of $C_4$-$C_{12}$ alcohols and about 5-40 mole percent comprises hydroxy, epoxy or hydroxy and epoxy functional monomers, the copolymer having a molecular weight of between about 1000-20,000.

* * * * *